Figure 5:
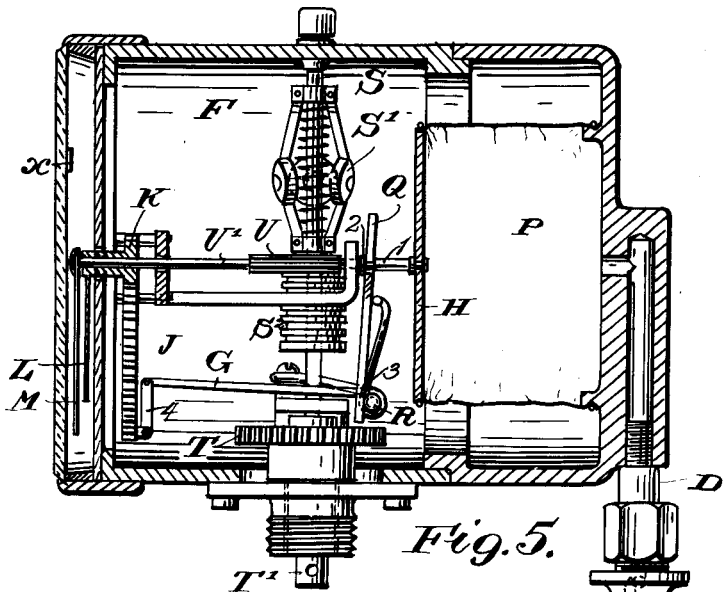

W. BOWDEN.
APPARATUS FOR INDICATING CONSUMPTION OF LIQUID FUEL.
APPLICATION FILED AUG. 8, 1913.
1,181,566.
Patented May 2, 1916.
2 SHEETS—SHEET 1.
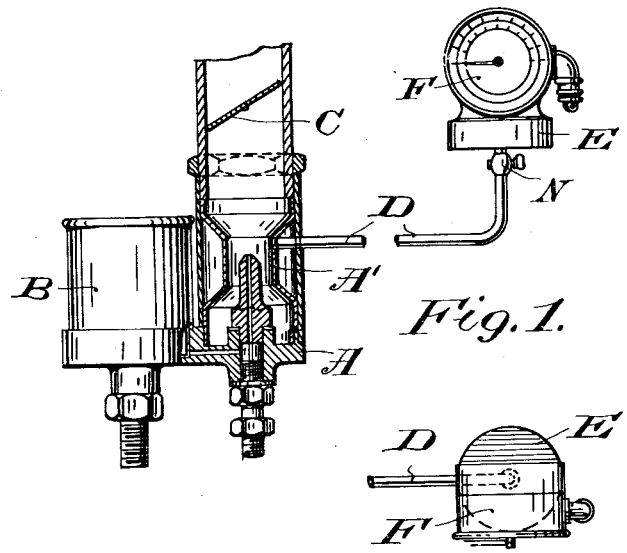
Fig. 1.
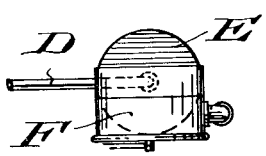
Fig. 2.
Fig. 3.
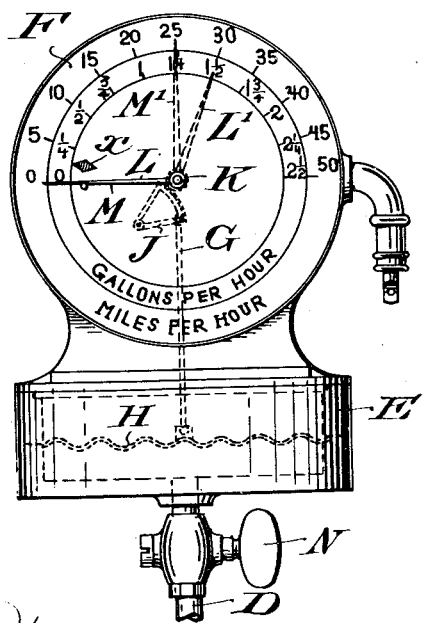
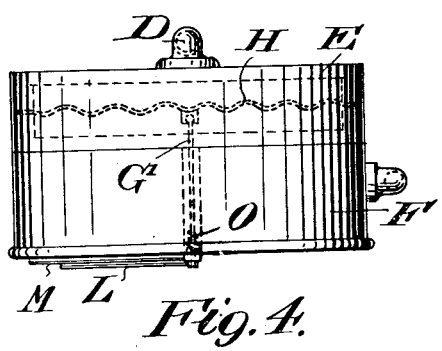
Fig. 4.
Witnesses
Inventor
William Bowden
by his Attorneys W. BOWDEN.
APPARATUS FOR INDICATING CONSUMPTION OF LIQUID FUEL.
APPLICATION FILED AUG. 8, 1913.

1,181,566.

Patented May 2, 1916.
2 SHEETS—SHEET 2.

Witnesses:

Inventor:
William Bowden

UNITED STATES PATENT OFFICE.

WILLIAM BOWDEN, OF MANCHESTER, ENGLAND.

APPARATUS FOR INDICATING CONSUMPTION OF LIQUID FUEL.

1,181,566.  Specification of Letters Patent.  Patented May 2, 1916.

Application filed August 8, 1913. Serial No. 783,773.

*To all whom it may concern:*

Be it known that I, WILLIAM BOWDEN, a subject of the King of Great Britain and Ireland, and a resident of Manchester, in the county of Lancaster, England, have invented new and useful Apparatus for Indicating Consumption of Liquid Fuel, of which the following is a specification.

This invention relates to apparatus for giving a reading of the rate of consumption of liquid fuel for internal combustion engines in conjunction with a reading of the speed of a motor car driven by such engines, so that by comparison of the readings it can be easily ascertained whether the rate of fuel consumption is or is not in excess of that which is normal to the speed of the car.

In carrying this invention into effect an instrument is employed which is so constructed and connected to the carbureter that its pointer or equivalent part will vary its position as the atmospheric pressure in the choke pipe of the carbureter varies. The atmospheric pressure in the choke pipe is governed by the throttle valve and governs or controls the rate of flow of fuel through the jet of the carbureter. As this atmospheric pressure varies the rate of flow varies. The instrument above referred to, in indicating the pressure in the carbureter choke tube, will also, therefore, give an indication of the rate of flow of fuel through the carbureter jet. Such an instrument I will hereinafter refer to as a fuel consumption indicator.

It can easily be ascertained by experiment what flow of fuel per time unit will take place under the atmospheric pressure conditions set up in the carbureter by the suck of the engine when driving the car at any given speed under normal conditions. The point where the needle or pointer of the fuel consumption indicator comes to under such pressure conditions is then marked on the scale with the rate of flow of fuel per time unit which then obtains. Variations of pressure in the carbureter choke tube produce variations in the position of the needle or pointer, and each of these variations of position is marked to indicate the rate of fuel flow which ensues for the corresponding variation in pressure to which the carbureter jet is exposed. To ascertain whether the fuel consumption is or is not normal for any speed of the car, the reading of the fuel consumption indicator has to be compared with a reading or an estimate of the speed of the car.

The accompanying drawings illustrate an instrument in which a speedometer is combined with a fuel consumption indicator whose readings of the variations of pressure at the jet of the carbureter are expressed in terms of the rate of liquid flow which ensues as a result of such variations.

Figure 1 illustrates the complete apparatus partly in elevation and partly in section. Fig. 2 shows the apparatus in plan. Fig. 3 is an elevation to a larger scale of the same instrument. Fig. 4 shows in plan a same instrument. Fig. 5 modification of the instrument. Fig. 5. shows a longitudinal section through the instrument, and, Fig. 6 a rear elevation of the instrument with the back removed.

A indicates a jet carbureter of any ordinary construction with the customary float chamber .B.

C is the customary throttle.

D is a small pipe opening into the choke tube $A^1$ of the carbureter as indicated.

Referring first to Figs. 1, 2 and 3, E is the fuel consumption indicator consisting of a pressure indicating gage to which the other end of the tube or pipe D is operatively attached. The fuel consumption indicator is disposed below a speedometer F of usual construction and operation. The separate index needles of the speedometer and of the fuel consumption indicator have independent angular movement around a common center. The light rod G from the diaphragm H of the fuel consumption indicator operates the quadrant J and pinion K to give angular movement to the finger L shown in one of its positions in broken lines $L^1$ in Fig. 3. The needle M of the speedometer which is operated in the usual way is also indicated in one of its positions $M^1$ in broken lines in Fig. 3. The fuel consumption indicator needle L moves along a scale marked in gallons per hour. The needle M moves along the usual speed scale marked in miles per hour.

The instrument shown in Fig. 3 is for a car which, running under normal conditions, would travel 20 miles on a consumption of one gallon of fuel, and would under like normal conditions consume greater or lesser quantities of fuel per hour as the speed increased or decreased. With such a car and with everything normal the speedometer needle would indicate 20 when the car was running at that number of miles per hour, and the partial vacuum set up by the suck of the pistons in the choke tube A¹ would be such as to cause a flow of fuel through the jet at the rate of 1 gallon per hour, and the needle of the fuel consumption indicator will be so adjusted as to move to a position which will be marked 1 on the gallons per hour scale. The 20 mark on the speed scale and the 1 mark of the consumption scale will be in the same radius. With the speedometer needle at 20 and the fuel consumption indicator needle at 1, one needle would lie over the other and there would apparently be only one needle in view. This would indicate that everything was correct. If the fuel consumption indicator needle was in advance, along its scale, of the speedometer needle it would indicate that an excessive consumption of fuel was taking place; if it lagged behind it would indicate that an economy in fuel was being effected. For example the indication shown by the needles in broken lines in Fig. 3 would show that a very excessive consumption of fuel was taking place. Speed indications and their corresponding consumption indications are in common radii. To prevent rapid oscillations of the fuel consumption indicator needle as a result of rapid fluctuations of pressure in the choke tube A¹, the tube D is preferably provided with a tap N by means of which the air passage into the gage can be so choked that the rapid fluctuations of pressure in the choke tube A¹ do not materially affect the diaphragm H and such diaphragm is only deflected to an extent which results from the mean pressure of the fluctuations. When desired however, the tap N can be fully opened so as to get the most extreme oscillations of the gage needle.

A modified form of instrument is shown in Fig. 4. In this the diaphragm H of the fuel consumption indicator is arranged at the back of the joint instrument, normally parallel to the dial. The speedometer needle M is operated in the usual way. The hub of the fuel consumption indicator needle L is formed with a small coarsely pitched screw nut O. A corresponding screw thread which engages with such nut is cut on the end of the non-rotatable shaft G¹ projecting from the center of the diaphragm. As the shaft G¹ moves axially owing to diaphragm deflections the nut and the finger L turn angularly.

Figure 6:
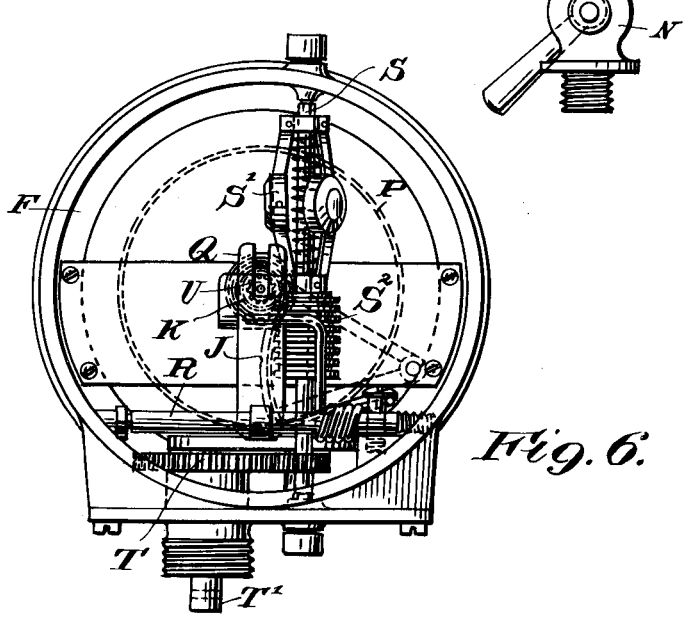

Other forms of fuel consumption indicator than the corrugated diaphragm form may be used. In Figs. 5 and 6 there is shown one in which a collapsible chamber or bellows P is in communication with the choke tube of the carbureter by means of the pipe D. The rigid end wall H of this collapsible chamber is provided with a projecting member 1 which passes between and engages with one side of the prongs of a forked lever Q by means of the collar 2 formed on it. When the pressure in the chamber P is reduced, the end wall H of the collapsible chamber moves inward and carries the lever Q with it, the forked end of the lever allowing this movement. When the pressure in chamber P increases the end H of the chamber moves outward as a consequence of the pressure exerted by the spring 3 on the lever Q. The lever Q is secured to the oscillating shaft R which also has secured to it the lever G; these two levers act as the limbs of a bell-crank lever oscillating on the shaft R. The end of the lever G is connected to the quadrant J by means of the link 4. When the rigid end wall H of the collapsible chamber P moves, its movements in either direction are imparted to the lever Q by means of the combined action of the spring 3 and the end H of the collapsible chamber. The movements of the lever Q are communicated to the lever G as both these levers are connected to the same shaft R, and as the end of the lever G is coupled to the quadrant J by means of the link 4 the lever G will communicate its movements to the quadrant. The quadrant J gears with the pinion K on which is attached the fuel consumption indicating finger. The speedometer shown in these figures is, by way of example, of the centrifugal type. As the spindle S is rotated from the shaft T¹ driven from the road wheel of the car through the gearing T, the weights S fly outward and raise the sleeve S² provided with annular teeth which mesh with the pinion U on the shaft U¹ and move the speed indicating finger M over the scale. Other forms of carbureter than the jet form can be similarly connected to the vacuum gage.

In addition to being used for indicating the rate of fuel consumption during the running of the car, the fuel consumption indicator may be employed to give an indication as to whether the consumption is or is not normal while the engine is running slow and the car is at rest. It having been ascertained what position the needle L would occupy under such conditions, its then position is marked in a distinctive shape or color as for example as shown at x Fig. 3. Should the needle L move past x when the engine is running under the indicated conditions it is a warning that something is wrong.

What I claim is:—

An instrument for indicating the speed of a vehicle driven by an internal combustion engine having a carbureter, and for indicating the fuel consumption of such engine, comprising a casing, a dial secured thereto and provided with two concentric scales, one scale being calibrated to indicate the speed of the vehicle and the other to indicate the fuel consumption of the engine, an indicator for the speed scale, means responsive to the speed of said vehicle for operating said indicator, an indicator for the fuel consumption scale, a chamber having a movable wall and secured in said casing, means operatively connecting said wall to the last named indicator, and means for connecting said chamber to the choke tube of the carbureter of said engine.

In witness whereof I have hereunto set my hand in the presence of two subscribing witnesses.

WILLIAM BOWDEN.

Witnesses:
 FRANK A. HEYS,
 WILLIAM GEO. HEYS.